Nov. 26, 1968 A. L. SEIFRIED 3,413,564

COMBINED A.G.C. AND INDICATOR CIRCUIT

Filed May 19, 1966 2 Sheets-Sheet 1

INVENTOR
ALBERT L. SEIFRIED

BY George H. Fritzinger
AGENT

Nov. 26, 1968 A. L. SEIFRIED 3,413,564
COMBINED A.G.C. AND INDICATOR CIRCUIT
Filed May 19, 1966 2 Sheets-Sheet 2

INVENTOR
ALBERT L. SEIFRIED
BY George H. Fritzinger
AGENT 3,413,564
COMBINED A.G.C. AND INDICATOR CIRCUIT Albert L. Seifried, Mendham, N.J., assignor to McGraw-Edison Company, Elgin, Ill., a corporation of Delaware
Filed May 19, 1966, Ser. No. 551,311
5 Claims. (Cl. 330—29)

This invention relates to a combined A.G.C. (automatic gain control) and volume indicator system for dictating machines.

It has been common practice heretofore to provide dictating machines with an indicator lamp the brightness of which is controlled by the output signal to indicate the output signal level. Further, the amplifier is commonly provided with automatic gain control to prevent overloading the recorder should the dictator speak loudly directly into the microphone especially when the gain is turned up for conference recording. Since in an A.G.C. system there is derived a D.C. voltage from the output signal to control the amplifier gain, it is common practice to operate the indicator lamp directly from this fluctuating D.C. voltage for reasons of simplification and economy. However, when the indicator lamp and A.G.C. system are so combined there has been encountered the difficulty that if the lamp burns out it disables not only the A.G.C. system but the whole main amplifier as well.

An object of the present invention is to provide an improved combination of A.G.C. and Indicator System in which not only the main amplifier but also the A.G.C. portion of the amplifier are retained in operative condition should the indicator lamp burn out.

Another object is to achieve the aforestated objective by very simple and economical means.

These and other objects and features of the invention will be apparent from the following description and the appended claims.

Figure 1:
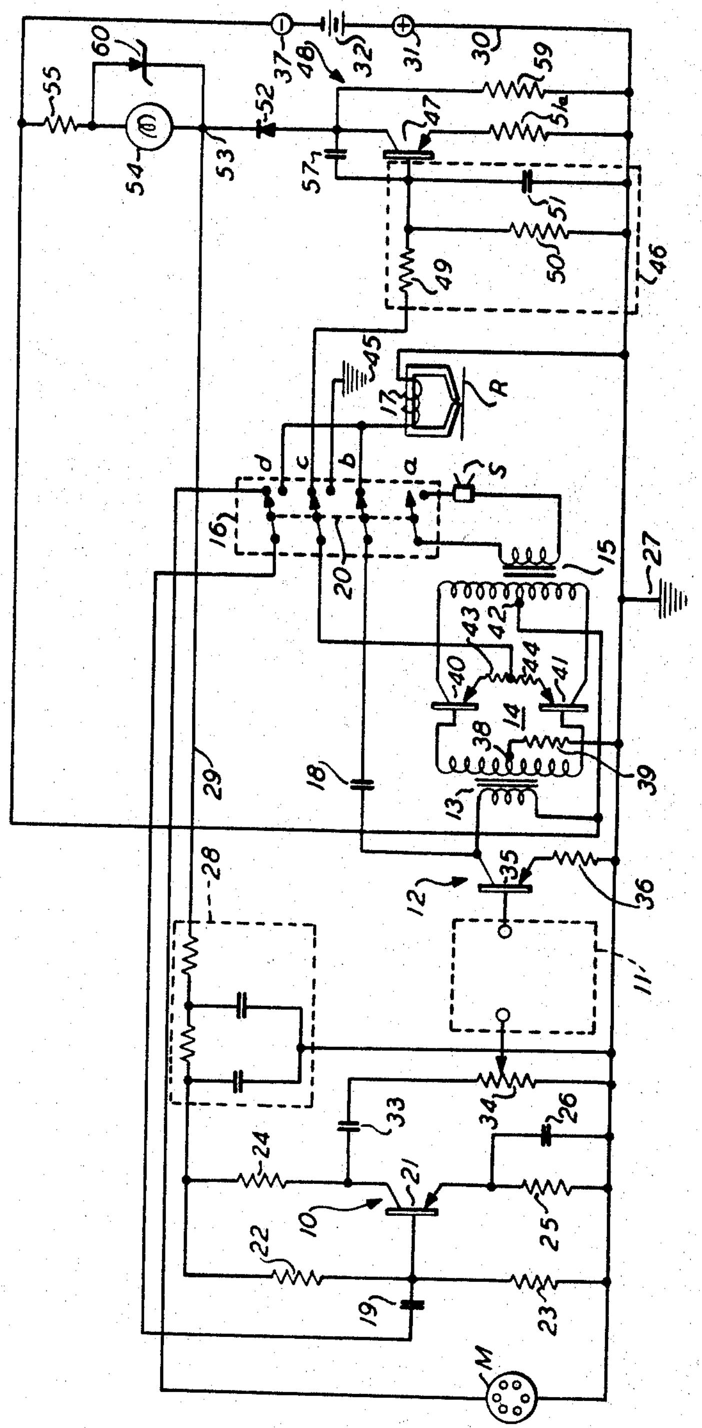
Figure 2:
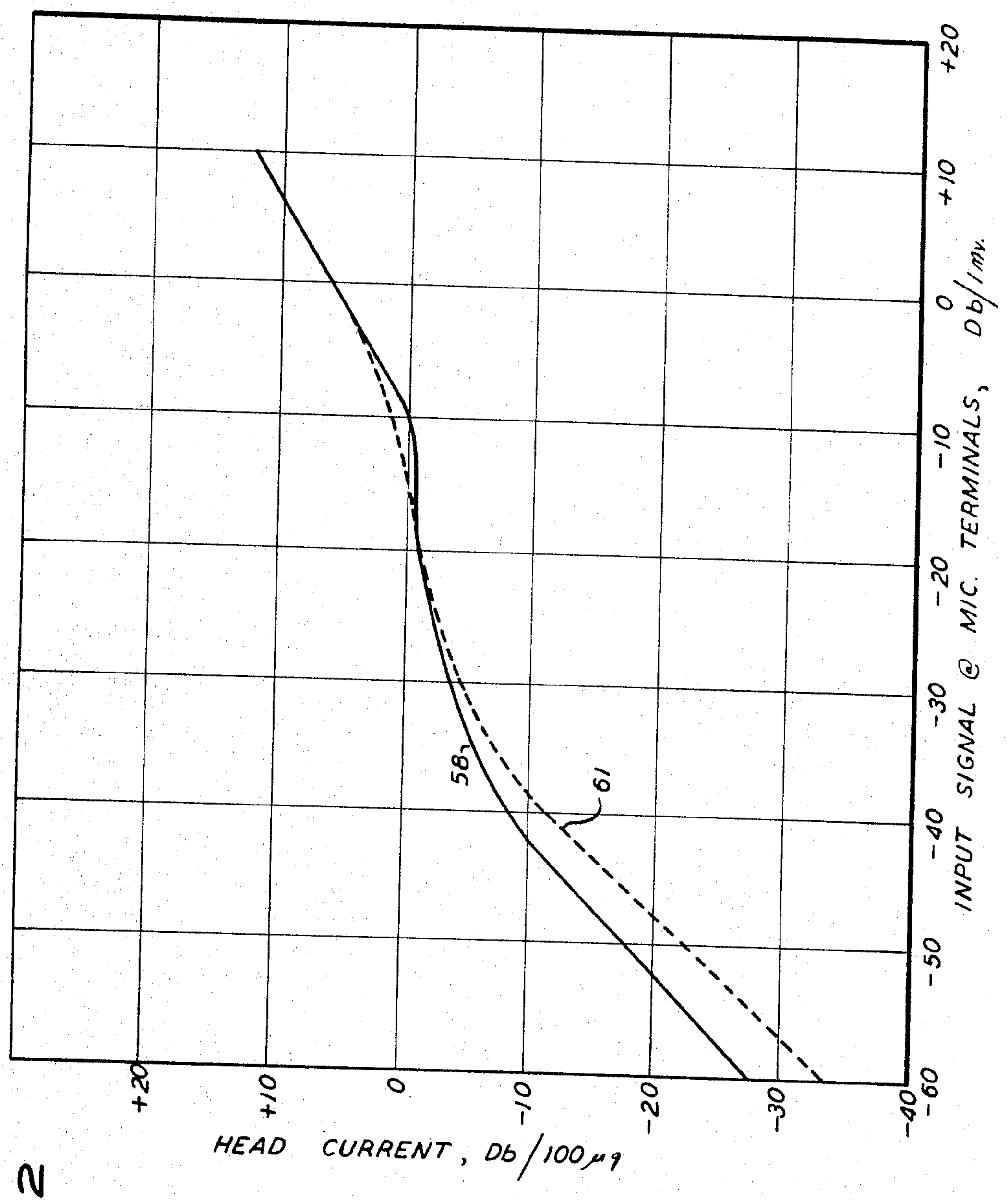

In the description of my invention, reference is had to the accompanying drawings, of which:

FIGURE 1 is a schematic circuit diagram of an amplifier embodying a combined automatic gain control and volume indicator system in accordance with the invention; and FIGURE 2 is a set of A.G.C. curves for the present amplifier.

The main amplifier includes an input stage 10 coupled through intermediate stages 11 (diagrammatically shown) to a driver stage 12. The driver stage is coupled through an interstage transformer 13 to a balanced class B power stage 14 itself connectable through an output transformer 15 and section *a* of a record-reproduce switch 16 to a speaker S. The record-reproduce switch 16 is of a four pole type shown in FIGURE 1 in its record position. A magnetic recorder-reproducer 17 cooperable with a magnetic record medium R is connectable either through a section *b* of the RR switch 16 and a capacitor 18 to the output of the driver stage 12 when the machine is conditioned for recording or through a section *d* lower contact of the RR switch 16 and a condenser 19 to the input of the input stage 10 when the machine is conditioned for reproducing. A microphone M is connectable through a section *d* upper contact of the RR switch 16 and condenser 19 to the input of the input stage 10 during recording. By means of a tie bar 20 the different sections of the RR switch 16 are ganged together so that when the RR switch 16 is in its upper or record position (1) the microphone is connected to the input of the main amplifier, (2) the head 17 operating as a recorder is connected to the output of the driver stage 12, and (3) the power stage 14 is connected to an A.G.C. stage 48 later described. Further, when the RR switch 16 is in reproduce position (1) the head 17 operating as a reproducer is connected to the input of the main amplifier, and (2) the power stage 14 is disconnected from the A.G.C. stage and connected instead to the speaker S. The remaining description pertains to the operation when the RR switch 16 is in the record position shown in FIGURE 1.

The input stage comprises a transistor 21 of, for example, the type PNP having a base receiving a bias voltage from a voltage divider circuit comprising resistors 22 and 23, a collector connected to a load resistor 24 and an emitter connected through resistor 25 and condenser 26 in parallel to a ground 27. The voltage divider circuit 22–23 and load resistor 24 are connected through an R–C decoupling network 28 to a voltage supply lead line 29 of negative polarity. The ground 27 is connected by lead line 30 to plus terminal 31 of a source of D.C. voltage indicated by a battery 32.

The input stage 10 is coupled through a condenser 33, volume control rheostat 34 and intermediate stages 11 to the base of transistor 35 of the driver stage 12. The emitter of the transistor 35 is connected through resistor 36 to ground 27 and the collector is connectable through the condenser 18 and switch **16*b* to the recorder 17 as before described. Further, the collector is connected through a primary winding of the interstage transformer 13 to a negative terminal 37 of the battery 32. The second winding of this interstage transformer has a center tap 38 connected through a resistor 39 to ground 27 and is connected at its ends to the base elements of transistors 40 and 41 constituting the class B power stage 14. The collectors of transistors 40 and 41 are connected to the balanced primary winding of the output transformer 15 having a center tap 42 connected also to the negative terminal 37. The secondary winding of this output transformer is connectable through the switch 16*a*** to the speaker S as before described.

The emitters of the output transistors 40 and 41 are interconnected through resistors 43 and 44, and the junction between these resistors is connectable by the switch **16*c* either to ground 45 or through an R-C delay network 46 to the base of a transistor 47 forming part of the A.G.C. stage 48. The delay network 46 comprises series resistors 49 and 50 and a condenser 51 in shunt with the resistor 50. The emitter of the transistor 47 is connected through resistor 51 to ground and the collector is connected through a diode 52 to a junction 53 from which runs the voltage supply lead line 29 to the input stage 10. The junction 53 is further connected through a filament type volume indicator lamp 54 and a resistor 55 to the negative terminal 37 of the battery 32. Thus, there is formed a voltage divider circuit in the A.G.C. system across the battery 32 for supplying a variable voltage to the lead line 29. The lower arm of this voltage divider circuit comprises the collector-emitter of the transistor 47 and the diode 52, and the upper arm comprises the indicator lamp 54 and resistor 55**.

Since the output stage 14 is operated class B, full-wave rectified pulses of the amplified signal appear in the emitter circuit. These rectified pulses are filtered by the R-C network 46 before they are fed to the transistor 47. Another condenser 57 is connected from the collector to base of the transistor 47 to provide a negative feedback which rises with the frequency of the signal whereby to suppress the higher harmonic components in the A.G.C. system received from the output stage 14. As the level of the control voltage is increased the bias voltage on the base of the transistor 47 is increased by the emitter circuit voltage from the output stage 14. When this bias begins to exceed the emitter voltage on the transistor 47 determined by the bias resistor 51, the collector and emitter resistance of the transistor 47 begins to decrease and to reduce the supply voltage on the lead line 29 connected to the input stage 10. This decrease in the supply voltage to the input stage reduces the gain as shown by the curve 58 of FIGURE 2.

As the supply voltage to the lead line 29 is reduced, the voltage drop across the indicator lamp is increased causing the lamp to have an increased brightness indicative of the increased signal level. In order that the lamp will have a minimal brightness when there is no signal spoken into the microphone, a resistor 59 is connected from the collector of the transistor 47 to ground. Further, in order to place a limit on the minimum level to which the supply voltage to the input stage can be reduced as the input signal is increased, the diode 52 is poled in the direction of the applied voltage so as to provide a fixed voltage drop in the lower arm of the voltage divider circuit of the A.G.C. system irrespective of the signal level.

During recording, the power stage 14 is utilized only to drive the A.G.C. system through its emitter circuit. Although the voltage in the emitter circuit is low the transistor 47 of the A.G.C. stage operating as a D.C. amplifier serves to provide a sufficient D.C. voltage variation with changes in signal level to control the gain of the input stage 10 through its limits of gain control.

Heretofore, if the indicator lamp 54 should burn out, not only was the A.G.C. system disabled but the voltage supply to the entire first stage 10 was cut off to disable the main amplifier as well. Burn out of the indicator lamps will occur not only because they are of the filament type but also because the variable voltage supplied thereto by the A.G.C. action sometimes exceeds the rated voltage of the lamp when loud signals are spoken into the microphone. The susceptibility of the entire machine becoming disabled at any time through burn out of the indicator lamp has rendered this type of combined A.G.C. and indicator system well nigh impractical to use. Further, attempts to correct this deficiency by placing a fixed resistor across the lamp 54 has been ineffective because if such resistor is made sufficiently low to maintain a normal supply voltage to the voltage line 29 when the lamp burns out, it will shunt the lamp heavily and render it ineffective as a volume indicator, and if this resistor were made sufficiently large to maintain the effectiveness of the lamp as an indicator then the voltage supply is cut down to reduce the gain to an insufficient level when the lamp burns out.

By the present invention the aforestated difficulties are overcome by connecting a Zener diode 60 across the indicator lamp 54 in a reversed polarity and by connecting the fixed resistor 55 in series with the lamp. A lamp is selected having a rated voltage at about the maximum voltage which it receives in the A.G.C. system at maximum signal. A Zener diode is chosen having a critical voltage, called the Zener voltage, at about or slightly less than the voltage rating of the indicator lamp. So long as the voltage drop across the lamp does not reach its fully rated value, the reverse bias on the Zener diode 60 is less than its critical voltage causing the diode to be non-conductive or, in other words, to present such high resistance across the lamp as to have essentially no effect on the brightness of the lamp or on the operation of the A.G.C. system. At high signal levels, the critical voltage is reached and the Zener diode conducts to place a limit on the voltage which can be applied across the lamp. By this limiting action the lamp is safeguarded against being overloaded and of burning out prematurely. On the other hand, if the lamp does burn out the initial relatively high resistance of the Zener diode causes the voltage across the Zener diode to reach instantly the Zener voltage whereat the Zener diode becomes conductive. This retains the amplifier in operative condition notwithstanding that it has a slight negative effect of reducing the gain of the amplifier somewhat at signal levels below that at which the A.G.C. action comes into play, as shown by curve 61 in FIGURE 2. At the higher signal levels which cause the A.G.C. system to come into action, the gain of the amplifier obtained when the lamp is burned out merges with that which is obtained when the lamp is present by reason of the resistor 55 being connected in series with the lamp 54.

The embodiment of my invention herein particularly shown and described is intended to be illustrative and not necessarily limitative of my invention since the same is subject to changes and modifications without departure from the scope of my invention, which I endeavor to express according to the following claims.

I claim:

1. An automatic gain control and volume indicator system comprising a main amplifier including an amplifier stage having a gain control line for increasing and decreasing the gain of the main amplifier as the voltage supply to said line is increased and decreased, a D.C. source of voltage, a voltage divider connected across said source for providing a variable voltage to said gain control line, said voltage divider having a first arm including an indicator lamp and a second series arm including the collector-emitter of a transistor, said divider having a junction point between said arms connected to said gain control line, means for rectifying the signal output voltage from said main amplifier and feeding the same to the base element of said transistor whereby the resistance of said transistor is decreased and increased respectively with increase and decrease in signal voltage causing the voltage to said line to decrease and increase respectively as the signal input level is increased and decreased, and a Zener diode connected across said indicator lamp in reverse polarity to the voltage applied across the lamp to obtain a reverse bias across the diode by the voltage drop across said lamp causing the diode to be non-conducting, said diode having a Zener voltage substantially at the voltage obtained across said lamp when the signal input voltage is at maximum level.

2. The automatic gain control and volume indicator system set forth in claim 1, including a fixed series resistor in said first arm of said divider circuit to cause a variable control voltage to be supplied to said gain control line responsive to a variable signal voltage after lamp burn out.

3. The automatic gain control and volume indicator system set forth in claim 1, including a diode connected in said second arm of said divider polarized in the direction of said source to be constantly conductive and provide a fixed voltage drop in the divider circuit whereby to place a minimum limit on the voltage to said gain control line when the signal level is at a maximum.

4. The automatic gain control and volume indicator system set forth in claim 1, including a capacitor interconnected between the collector and base of said transistor to provide negative feed back of an extent rising with increasing frequency whereby harmonic components in the rectified signal voltage fed to said base element of said transistor are attenuated.

5. The automatic gain control and volume indicator system set forth in claim 1 wherein the gain control stage of the main amplifier is of the transistor type and wherein said variable voltage provided by said voltage divider is the supply voltage for said gain control stage.

References Cited

UNITED STATES PATENTS 2,841,702 7/1958 Barton ------------ 330—29 X

NATHAN KAUFMAN, *Primary Examiner.*